United States Patent [19]

Saravis, deceased et al.

[11] Patent Number: 4,512,617
[45] Date of Patent: Apr. 23, 1985

[54] LINEAR BALL BEARING WHICH ACCOMMODATES SHAFT MISALIGNMENT

[75] Inventors: Lawrence M. Saravis, deceased, late of Milford, by Nancy Saravis, executrix; Jeffrey A. Stein, Bridgeport; Darren S. Saravis, Milford, all of Conn.

[73] Assignee: The Barden Corporation, Danbury, Conn.

[21] Appl. No.: 586,768

[22] Filed: Mar. 6, 1984

[51] Int. Cl.³ ............................................. F16C 29/06
[52] U.S. Cl. .................................................. 308/6 C
[58] Field of Search ..................... 308/6 C, 6 R, 6 A; 464/168

[56] References Cited

U.S. PATENT DOCUMENTS

| | | | |
|---|---|---|---|
| 3,545,826 | 5/1969 | Magee | 308/6 C |
| 3,893,732 | 7/1975 | McCloskey | 308/6 C |
| 3,933,396 | 1/1976 | Nilsson | 308/6 C |
| 4,443,042 | 4/1984 | Walter et al. | 308/6 C |

Primary Examiner—Lenard A. Footland
Attorney, Agent, or Firm—Shenier & O'Connor

[57] ABSTRACT

An improved linear ball bearing which accommodates shaft misalignment in which a sleeve surrounds an assembly of a cage having unloaded ball path portions adjacent to the sleeve and loaded ball path portions adjacent to the shaft with load plates disposed between the loaded path portions and the sleeve. Internal bosses on the sleeve engage the load plates intermediate the ends thereof to permit them to rock to accommodate shaft misalignment.

11 Claims, 4 Drawing Figures

U.S. Patent  Apr. 23, 1985  Sheet 1 of 2  4,512,617
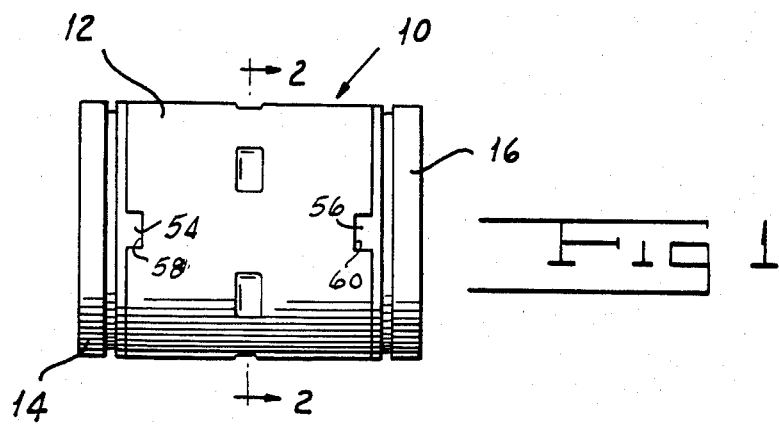
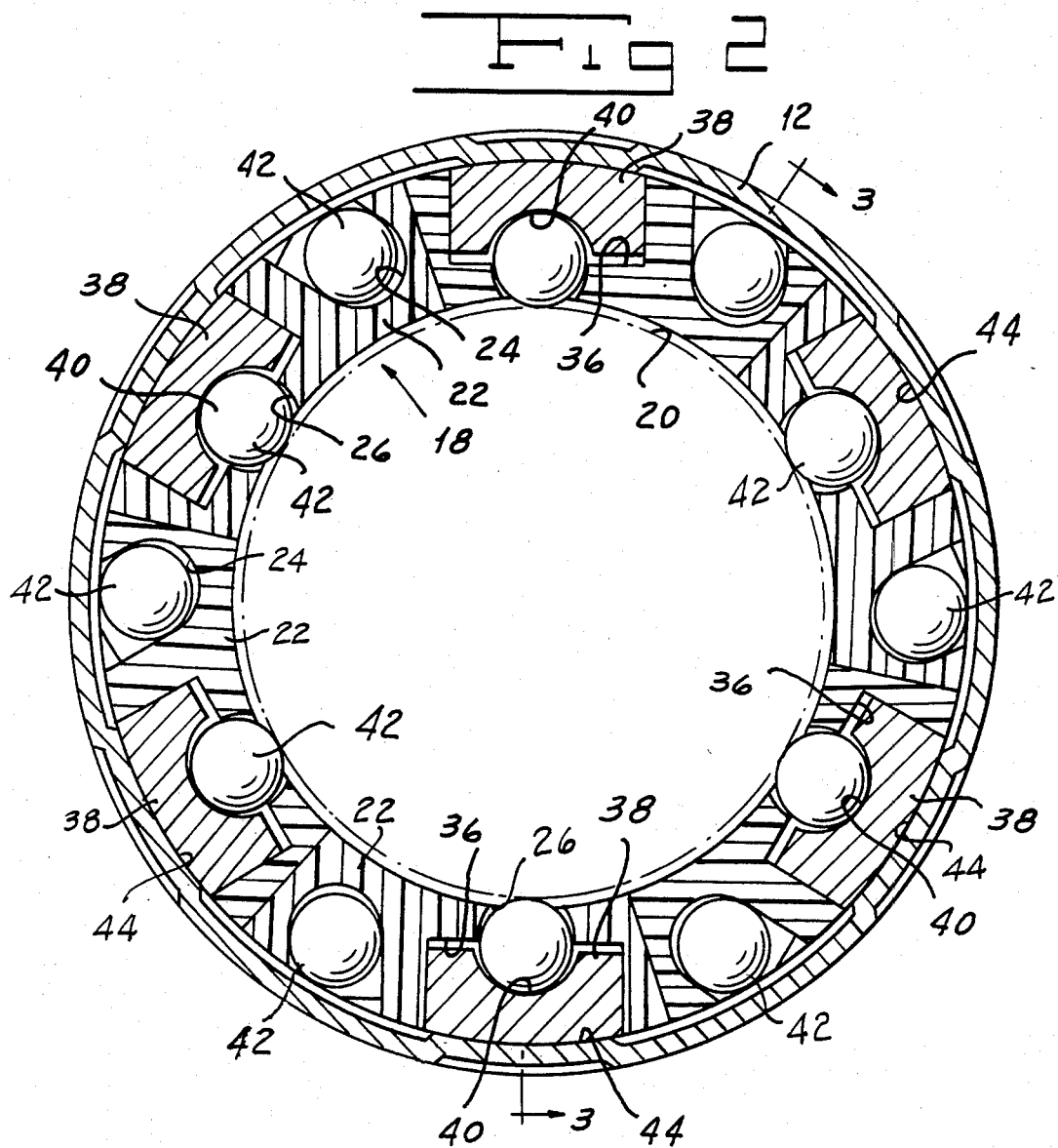

LINEAR BALL BEARING WHICH ACCOMMODATES SHAFT MISALIGNMENT

FIELD OF THE INVENTION

Our invention relates to the field of linear ball bearings and more particularly to an improved linear ball bearing which accommodates shaft misalignment.

BACKGROUND OF THE INVENTION

There are known in the prior art linear ball bearings which receive shafts for rectilinear movement in the direction of the shaft axis. Generally such bearings include a plurality of circumferentially spaced closed ball paths, each of which includes a loaded ball path portion in which balls are disposed along a line parallel to the shaft axis and are in load-bearing relationship with the shaft and a member which transmits the load to the bore in which the shaft is mounted.

Each of the raceways also includes an unloaded ball path portion in which balls are disposed along a line parallel to the shaft axis, which balls are unloaded. Transition path portions are provided between the ends of the loaded ball path portion and the unloaded ball path portion.

Owing to the construction described above, linear ball bearings of the prior art must be constructed with a high degree of accuracy. Most of the linear ball bearing assemblies of the prior art do not readily accommodate either axial or radial misalignment of the shaft relative to the bore in which it is to be mounted by the bearing assembly.

Attempts have been made in the prior art to provide linear ball bearings which have the capability of accepting some misalignment of the shaft relative to the bore in which it is to be mounted. For example, Magee et al U.S. Pat. No. 3,545,826 discloses a linear ball bearing assembly including a cage of synthetic resin formed with unloaded ball path portions and with openings into which load-carrying plates are adapted to be snapped to complete the loaded ball path portions. The assembly of the cage, the load-carrying plates, and the balls is adapted to be inserted into the working bore.

In the arrangement disclosed in Magee et al, each of the load-carrying plates which are snapped into the synthetic resin cage, has a central thicker portion. These thickened central portions permit the load carrying plates to rock slightly by displacement of the resilient mass of the cage to accommodate angular displacement of the shaft relative to the bearing axis. In Magee et al the load plates are so constructed as to be biaxially resilient to distribute load. If the mounting bore is only roughly finished or is of soft material, an intermediate sleeve may be used.

While the Magee et al construction accommodates some shaft misalignment, it incorporates a number of disadvantageous features. First, in most installations it must react against the mounting bore in accommodating shaft misalignment. The relatively resilient load-bearing plates do not provide as good a bearing track as do relatively rigid plates.

SUMMARY OF THE INVENTION

One object of our invention is to provide an improved linear ball bearing which accommodates axial shaft misalignment.

Another object of our invention is to provide an improved linear ball bearing which accommodates shaft misalignment without reacting against the mounting bore.

A further object of our invention is to provide an improved linear ball bearing which employs rigid load bearing plates, while at the same time accommodating misalignment.

Yet another object of our invention is to provide an improved linear ball bearing which accommodates misalignment without applying load forces to the bearing cage.

Other and further objects of our invention will appear from the following description.

BRIEF DESCRIPTION OF THE DRAWINGS

In the accompanying drawings to which reference is made in the accompanying specification and which is to be read in conjunction therewith and in which like reference characters are used to indicate like parts in the various views:

FIG. 1 is an elevation of our improved linear ball bearing.

FIG. 2 is a sectional view of our improved linear ball bearing taken along the line 2—2 of FIG. 1 and drawn on an enlarged scale.

DESCRIPTION OF THE PREFERRED EMBODIMENT

Figure 3:
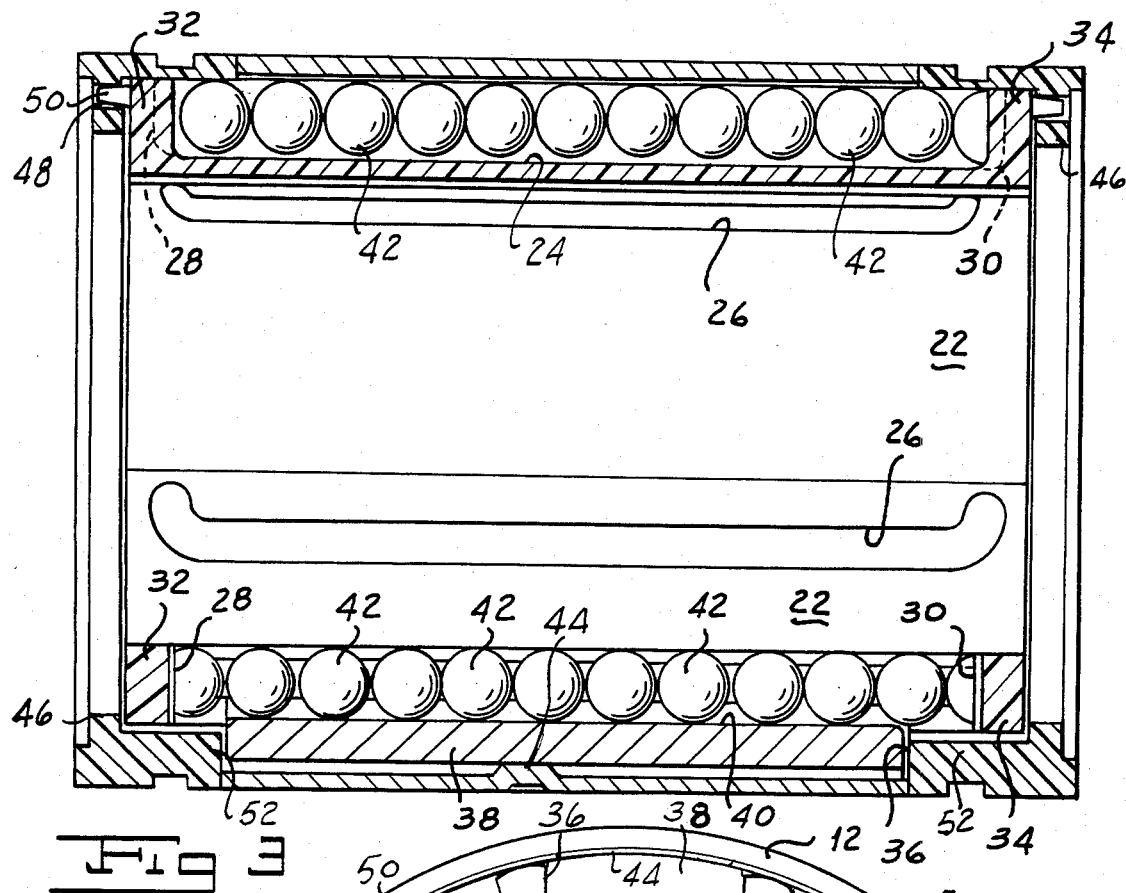
FIG. 3 is a sectional view of our improved linear ball bearing taken along the line 3—3 of FIG. 2 and drawn on a slightly reduced scale.
Figure 4:
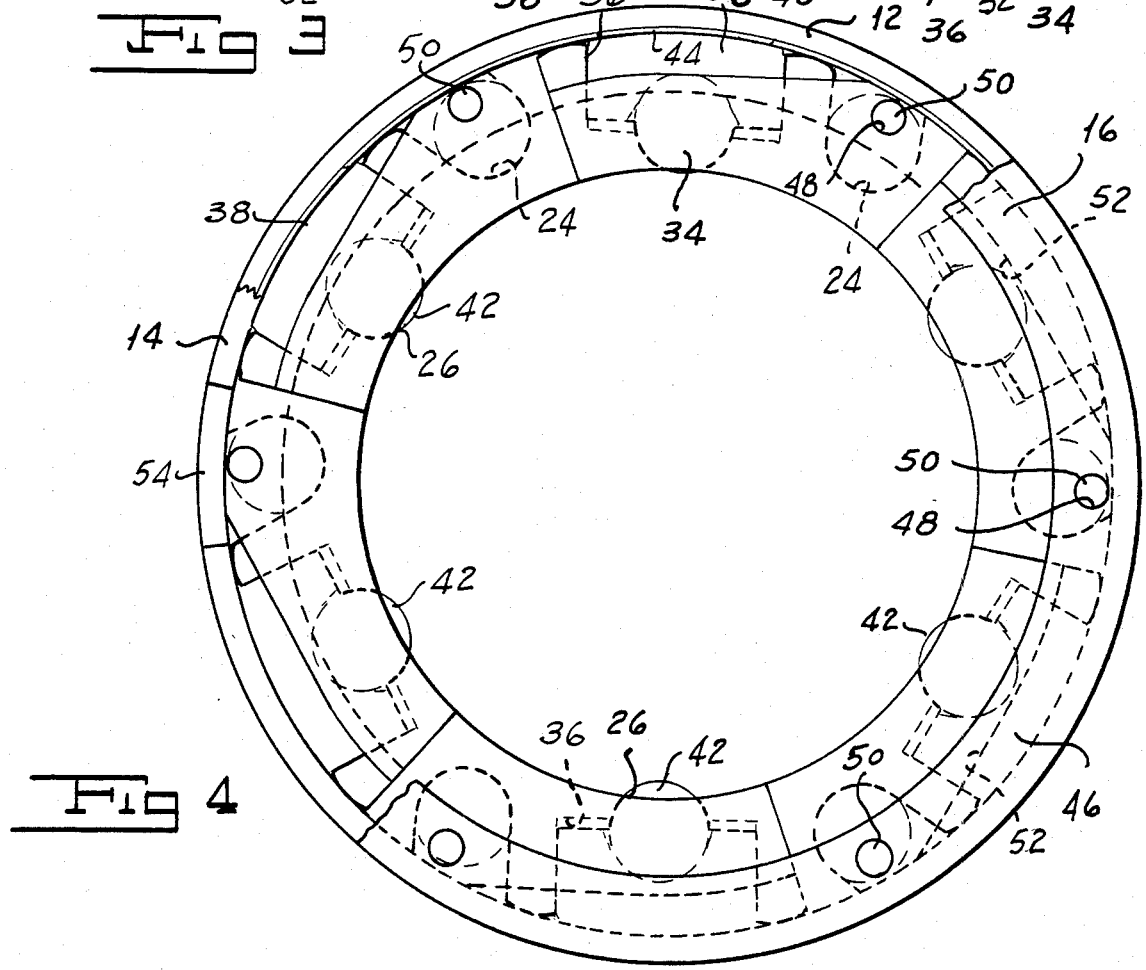
FIG. 4 is an end elevation of our improved linear ball bearing.

Referring now to the drawings, our improved linear ball bearing assembly indicated generally by the reference character 10 includes an outer sleeve 12 formed of a suitable load-bearing material such for example as steel, and respective left-hand and right-hand end caps 14 and 16 formed of a suitable synthetic resin. The ball cage indicated generally by the reference character 18 surrounds the shaft 20 to be supported by the bearing.

The cage 18 is made up of a plurality of segments 22 molded from a suitable synthetic resin. Each of the segments 22 includes a groove 24 forming an unloaded ball path portion and a slot 26 forming the loaded ball path portion, as well as respective transition path portions 28 and 30 at the ends 32 and 34 of the segments for connecting the ends of the groove 24 to the ends of the slot 26 to complete the ball path of the segment. Each of the segments 22 is formed with a recess 36 which receives a load plate 38 to complete the loaded ball path portions of the assembly. Each of the load plates 38 is formed with a groove 40 extending along the inner surface of the plate to provide a track for the balls in the loaded ball path portion. The ball path just described is adapted to be filled with balls 42. We form the sleeve 12 with a plurality of internal bosses 44 located at approximately the mid-points of the load plates 38 for cooperation with the plates in a manner to be described hereinbelow.

The end caps 14 and 16 are provided with radially inwardly extending flanges 46 which engage the ends of the sleeve 12 in the assembled position of the parts. These end flanges 46 are provided with a plurality of spaced holes 48 adapted to receive pins 50 on the ends of the segments. These pins 50 are secured in the holes 48 after the parts are assembled by any suitable means such, for example, as by ultrasonic welding. We form the flanges 46 of the end caps 14 and 16 with bosses 52 which locate the load plates 38 in the axial direction. The end caps 14 and 16 further are formed with pairs of generally diametrically oppositely extending tongues 54 and 56. When the bearing is assembled, the tongues 54 engage in slots 58 at one end of the sleeve 12 and tongues 56 engage in slots 60 at the other end of the tongue.

In assembling our improved linear ball bearing 10 with or without the use of an appropriate fixture, load plates 38 are assembled in the recesses 36, the cage 22 is introduced into the sleeve 12, the ball paths are filled with balls 42 and the end caps 14 and 16 are positioned on the ends of the sleeve, though these operations are not necessarily performed in that order. After the parts have been assembled, the pins 50 are fixed in the holes 48 by any suitable means, such as by ultrasonic welding. It will readily be appreciated that the tongues 54 and 56 engaging in the slots 58 and 60 rotationally position the sleeve 12 relative to the cage 22 so that the load plates 38 are aligned with the bosses 44. The arrangement is such that in an unloaded condition and during assembly and installation, our bearing allows appreciable rotational tolerance for the load plates.

In our bearing the load plates 38 are not held in position in the recesses 36 by the material of the cage 22 so that no load forces are applied to the cage material in operation of the bearing. The load plates 38 are relatively rigid. The bosses 44 permit the load plates to rock around axes perpendicular to their longitudinal axes to accommodate misalignment of the shaft in making a small angle with the mounting bore axis. In addition, the bosses are compliant or resilient so that they can deflect to maintain tolerance under high load. Our bearing thus can accept some radial misalignment. Our construction enables us to provide a seal which is an integral part of the design. In our bearing the load plates always remain parallel to the shaft so that there is full contact and full load absorption for all of the balls.

It will be seen that we have accomplished the objects of our invention. We have provided an improved linear ball bearing which accepts angular misalignment of the shaft without reacting against the mounting bore. Our bearing accepts misalignment while at the same time employing rigid load bearing plates. No load forces are applied to the cage of our bearing.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. An improved linear ball bearing including in combination a cage formed with a plurality of ball path portions including loaded ball path portions and unloaded ball path portions and transition ball path portions connecting said loaded and unloaded ball path portions, a plurality of load plates cooperating with said loaded ball path portions and a sleeve surrounding said cage and said load plates, said sleeve being provided with a plurality of internal bosses for cooperation with said load plates to permit said load plates to pivot around axes generally perpendicular to the lengths thereof.

2. An improved linear ball bearing for supporting a shaft for axial movement in a bore including in combination, a generally cylindrical ball cage, said cage being formed with a plurality of circumferentially spaced axially extending slots and a plurality of circumferentially spaced axially extending radially outwardly opening grooves disposed between adjacent slots and transition passages connecting the ends of each slot to the ends of an adjacent groove and elongated outwardly opening recesses over the respective slots, a plurality of elongated load plates in said recesses over said slots, a sleeve surrounding said cage and said plates whereby said plates and said cage around said slots cooperate to form loaded ball path portions and said sleeve and said grooves cooperate to form unloaded ball path portions, balls in said ball path portions and means on said sleeve for causing said load plates to tilt around axes generally perpendicular to their longitudinal axes in response to axial misalignment to accommodate such misalignment.

3. An improved linear ball bearing as in claim 2 including longitudinal grooves in said load plates for receiving said balls in said loaded ball path portions.

4. An improved linear ball bearing as in claim 2 in which said tilt causing means are internal bosses on said sleeve, said bosses engaging said plates intermediate the ends thereof.

5. An improved linear ball bearing as in claim 4 in which said bosses are resilient.

6. An improved linear ball bearing as in claim 4 including means for maintaining the circumferential alignment of said bosses with said plates.

7. An improved linear ball bearing for supporting a shaft for axial movement in a bore including in combination, a generally cylindrical ball cage formed of synthetic resin, said cage being formed with a plurality of circumferentially spaced axially extending slots and a plurality of circumferentially spaced axially extending radially outwardly opening grooves disposed between adjacent slots and transition passages connecting the ends of each slot to the ends of an adjacent groove and elongated outwardly opening recesses over the respective slots, a plurality of elongated rigid metallic load bearing plates disposed in said recesses over said slots, a metallic sleeve surrounding said cage and said plates whereby said plates and said cage around said slots cooperate to form loaded ball path portions and said sleeve and said grooves cooperate to form unloaded ball path portions, balls in said ball path portions, a plurality of internal bosses on said sleeve adapted to engage said plates intermediate the ends thereof to cause said plates to tilt around axes generally perpendicular to their longitudinal axes in response to axial misalignment to accommodate said misalignment, a pair of endcaps, means for securing said endcaps to said cage, and interengageable means on said endcaps and said sleeve for positioning said plates and said bosses in operative relationship.

8. An improved linear ball bearing as in claim 7 in which said cage is made up of segments and in which said securing means comprises interengageable means on said caps and said segments for holding said segments in properly assembled relationship to form said cage.

9. An improved linear ball bearing as in claim 7 in which said endcaps have shoulders for axially locating said plates.

10. An improved linear ball bearing as in claim 7 in which each of said bosses has a greater circumferential dimension than its axial dimension.

11. An improved linear ball bearing as in claim 7 in which said bosses are resilient.

* * * * *